(12) United States Patent
Jarry et al.

(10) Patent No.: US 6,335,484 B1
(45) Date of Patent: Jan. 1, 2002

(54) ELECTRICAL EQUIPMENT SUPPORT FOR ATTACHMENT TO TRUNKING

(75) Inventors: Patrice Jarry, Mont Saint Jean; Damien Adam, Saint Symphorien, both of (FR)

(73) Assignees: Legrand; Legrand SNC, both of Limoges (FR)

( * ) Notice: Subject to any disclaimer, the term of this patent is extended or adjusted under 35 U.S.C. 154(b) by 0 days.

(21) Appl. No.: 09/620,377

(22) Filed: Jul. 20, 2000

(30) Foreign Application Priority Data

Jul. 20, 1999 (FR) .............................................. 99 09399

(51) Int. Cl.[7] ................................................ H02G 3/10
(52) U.S. Cl. ........................ 174/48; 174/50; 174/68.3; 220/3.2
(58) Field of Search .............................. 174/48, 49, 50, 174/60, 67, 68.3, 95, 99 R, 50.54, 57; 220/3.2, 3.8, 3.3, 4.02, 4.01; 52/220.1, 220.3, 220.5, 220.7

(56) References Cited

U.S. PATENT DOCUMENTS 3,721,762 A * 3/1973 Gooding ...................... 174/48
5,614,695 A * 3/1997 Navazo ........................ 174/48
5,629,496 A * 5/1997 Navazo ........................ 174/48
5,942,724 A * 8/1999 Russo et al. .................. 174/48

FOREIGN PATENT DOCUMENTS

| DE | 44 32 669 | 9/1994 |
|----|-----------|--------|
| EP | 0 159 554 | 10/1985 |
| EP | 0 239 456 | 9/1987 |
| EP | 0 600 109 | 6/1994 |

* cited by examiner

Primary Examiner—Dean A. Reichard
Assistant Examiner—Angel R. Estrada
(74) Attorney, Agent, or Firm—Young & Thompson

(57) ABSTRACT

An electrical equipment support is associated with an adapter for fitting it to trunking of nominal width or to trunking of predetermined lower width. The adapter includes two closure flanges which are fitted between the trunking of lower width and the support along a respective portion of the transverse edges of the support. A baseplate is fitted to flank the base section of the trunking of lower width from one of the closure flanges to the other and has an engagement system for fastening the flanges together.

16 Claims, 5 Drawing Sheets

ELECTRICAL EQUIPMENT SUPPORT FOR ATTACHMENT TO TRUNKING

BACKGROUND OF THE INVENTION

1. Field of the Invention

The invention relates to electrical equipment supports for attachment to wiring trunking.

2. Description of the Prior Art

EP 0 702 442 A2 describes an electrical equipment support including a baseplate fixed to the wall above the trunking and a trunking fitted to the baseplate and covering the trunking. The cover can have one of three predetermined widths.

For the widest trunking, the baseplate is placed directly against one longitudinal edge of the base section of the trunking. For narrower trunking, flanges are used which act as spacers between the baseplate and the longitudinal edge of the base section of the trunking. These flanges also close off the remaining holes in the side walls of the cover.

The invention relates to a support of the same kind but which is improved in terms of fitting it to narrow trunking.

SUMMARY OF THE INVENTION

To this end the invention proposes an electrical equipment support for attaching to trunking of nominal width, the support including adapter means enabling it to be fitted to trunking of predetermined lower width, said adapter means including two closure flanges adapted to be fitted between said trunking of lower width and said support along a respective portion of the transverse edges of said support; wherein the adapter means further include a baseplate adapted to be fitted to flank the base section of said trunking of lower width from one of the closure flanges to the other and having engagement means adapted to fasten said flanges together.

The baseplate has the advantage of excellent retention of the flanges, which is beneficial in the event of an impact, in particular an impact in the longitudinal direction, unlike the closure flanges of the prior art support mentioned above, which have no interengagement means at the location of the opening which they close.

According to preferred features of the invention the support includes a clip-on member having along a first longitudinal edge a first series of clips comprising at least one clip and along its second longitudinal edge a second series of clips comprising at least one clip, each clip of the first and second series is adapted to interengage with a respective first retaining member and a respective second retaining member of the base section of said trunking of nominal width, and said baseplate has retaining means adapted to receive said first series of clips to enable said member of the support to be clipped by said first series of clips to said retaining means of said baseplate, when it flanks the base section of said trunking of lower width, and by said second series of clips to a retaining member of said trunking of lower width.

Thus the support according to the invention is fitted directly to trunking of the nominal width, which is simple, fast and convenient, unlike the prior art support mentioned above, with which the baseplate must be fixed to the wall above the trunking in all cases, including when it is used with the widest trunking.

In accordance with other features of the invention which are preferred because of quality of the retention obtained and for reasons of simplicity and convenience both in manufacture and installation:

said closure flanges each include tenons adapted to be engaged in mortises in said baseplate; and/or optionally said closure flanges each include a tenon adapted to interengage with a cap of said support; and/or optionally said closure flanges each have a plane wall framed on the inside by a rim transverse to said plane wall.

In accordance with other features of the invention which are preferred for reasons of convenience and simplicity of manufacture and use said baseplate and said closure flanges are molded in one piece with a portion of said support and adapted to be separated from it by areas adapted to be cut.

The explanation of the invention will now continue with a description of two embodiments, which description is given hereinafter by way of illustrative and nonlimiting example only and with reference to the accompanying drawings.

DETAILED DESCRIPTION OF THE PREFERRED EMBODIMENTS

Figure 1:
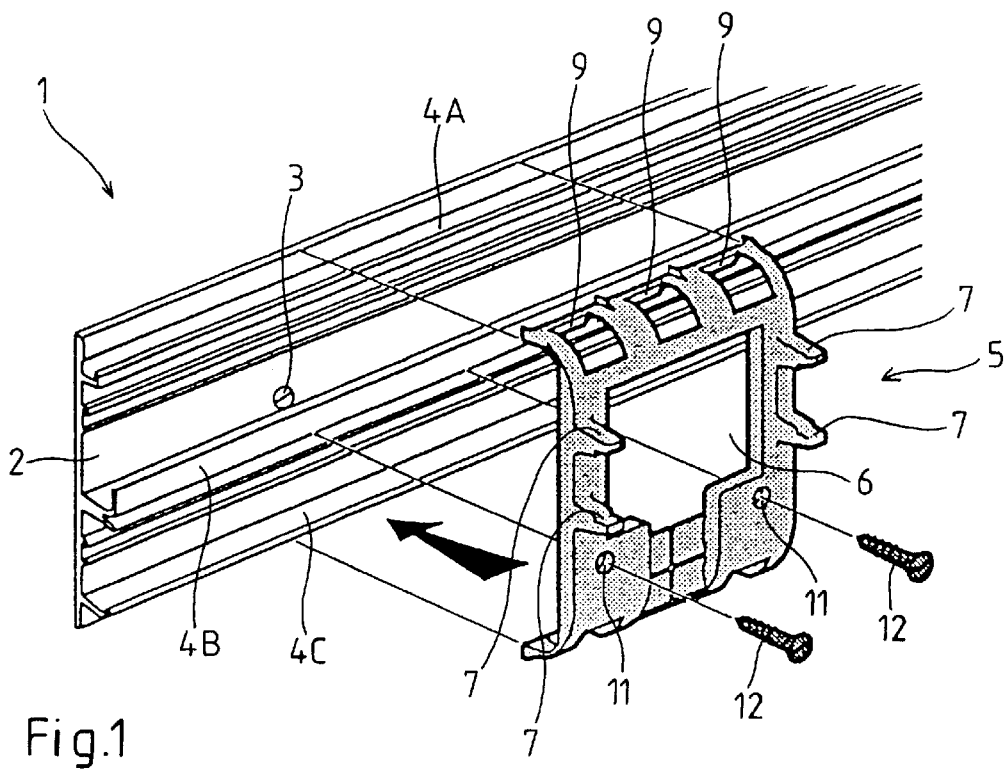
FIG. 1 is a perspective view showing how a plate which includes a first embodiment of an electrical equipment support according to the invention is fitted to a base section of trunking of nominal width.
Figure 2:
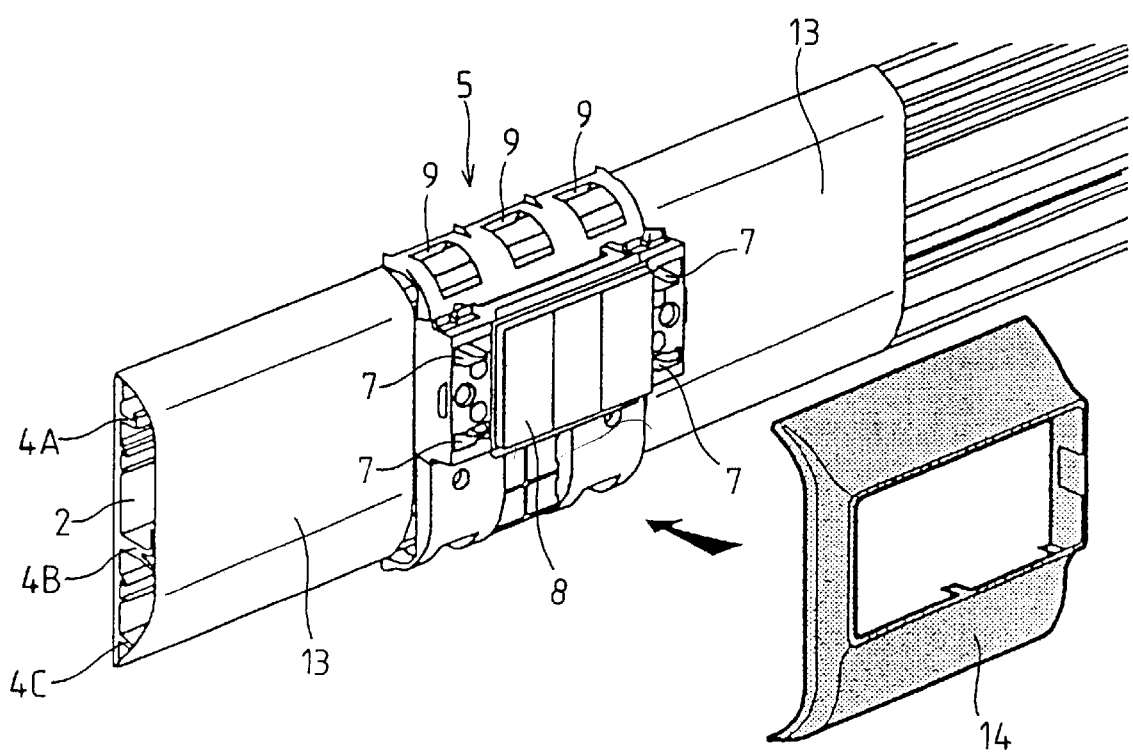
FIG. 2 is a perspective view showing the plate fitted to the base section with electrical equipment installed in the plate and the trunking cover fitted either side of the plate, and shows how the cap of this embodiment of the equipment support is fitted to the resulting assembly.
Figure 3:
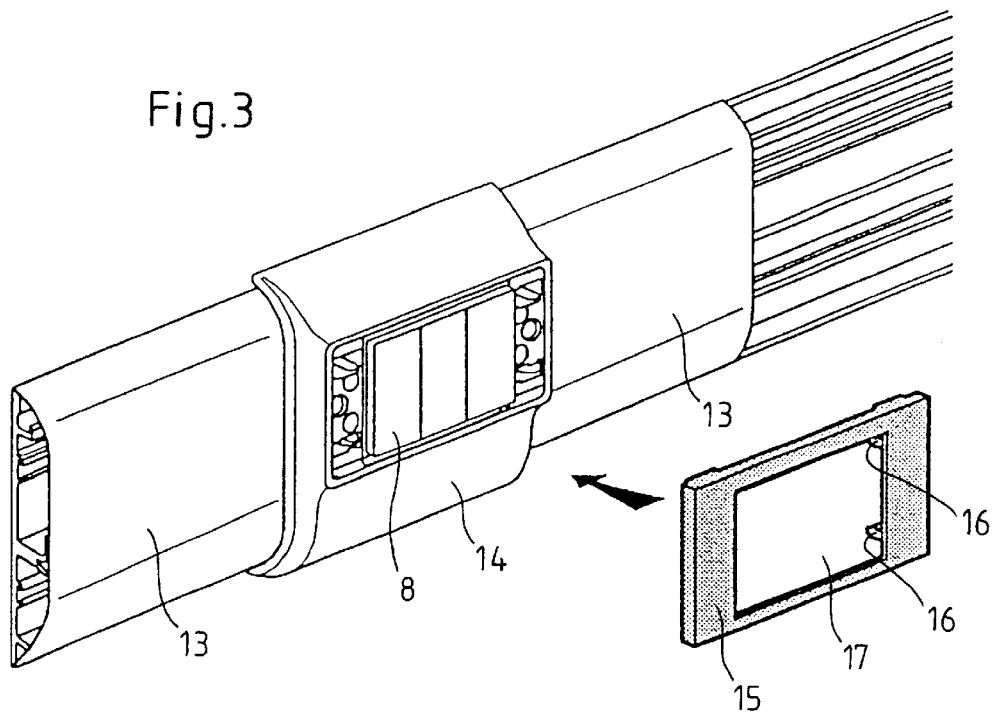
FIG. 3 is a perspective view similar to FIG. 2 showing the cap fitted to the plate and also showing an embellisher which can be fitted to the plate and to the cap.

The base section 1 shown in FIGS. 1 to 3 is part of trunking which is 120 mm high and 20 mm deep. The base section has a globally flat back or apron 2 whose rear face (the face which is hidden in FIGS. 1 to 3) is designed to be placed against the wall along which cables are to be routed, here at the base of a vertical wall to which the apron 2 is fixed by screws 3. The base section 1 also has a plurality of angle irons projecting from the front face of the apron 2, here three angle irons, namely a first longitudinal border angle iron 4A, a central angle iron 4B and a second longitudinal border angle iron 4C.

The plate 5 of the embodiment of the equipment support according to the invention shown in FIGS. 1 to 6 takes the general form of a frame with a central opening 6 to accommodate the electrical equipment. The edges of the plate 5 seen at the top and at the bottom in FIG. 1 are curved towards the rear and the edges seen on the left and on the right each have on their front face two fingers 7 for attaching electrical equipment such as the equipment 8 shown in FIGS. 2, 3 and 6.

Three openings are formed in the curved edge seen at the top in FIG. 1 and the rear side of each opening is extended by a clip 9 projecting slightly on the inside and lying in a plane parallel to that of the opening 6.

Similarly, the edge of the plate 5 seen at the bottom in FIG. 1 has two openings and the rear edge of each opening has a clip 10 (see FIG. 4) of similar shape to the clips 9.

The longitudinal edges of the plate 5, i.e. the edges seen at the top and at the bottom in FIG. 1, are separated at the locations of the series of clips 9 and the series of clips 10 by a distance substantially corresponding to the distance between the angle irons 4A and 4C, with which the clips 9 and the clips 10 respectively interengage when the plate 5 is pressed against the base section 1. The plate 5 is sufficiently elastic to be clipped on in this way, the clips 9 locating behind the flange of the angle iron 4A on the side opposite the apron 2 and the clips 10 engaging over a flange of the angle iron 4C which cannot be seen in FIGS. 1, 3 and 5 and projects relative to the flange of the angle iron 4C which is joined to the apron 2, on the side which is at the bottom in FIG. 1.

When the plate 5 has been clipped to the base section 1 in this way, the holes 11 are opposite the flange of the angle iron 4B which is joined to the apron 2. Screws 12 are passed through the holes 11 and screwed into this flange of the angle iron 4B, which is hollow for this purpose, to fasten the plate 5 firmly to the base section 1.

To install the equipment 8, the cables to be connected to it are fed out through the opening 6 and connected up and the equipment 8 is then clipped to the fingers 7.

The cap 14 is then clipped to the plate 5 when lengths of the cover section 13 of the trunking have been fitted on respective opposite sides of the plate 5 which lies against the trunking. The cap 14 has clips adapted to fit over the longitudinal edges of the plate 5, to be more precise, in the case of the edge seen at the top in FIGS. 1 and 2, over the side of the two end openings opposite the clips 9 and, in the case of the edge seen at the bottom, the side of the openings opposite the clips 10.

The cap 14 is wider than the plate 5 so that when it is fitted to the plate not only does it cover the plate but each of its transverse edges also covers a length of the cover section 13. The inside edge of each of the longitudinal edge portions of the cap 14 has exactly the same profile as the outside surface of the cover section 13, as can be seen in FIG. 3, with the result that the edge of the transverse edge portion of the cap 14 is in contact with the outside surface of the cover section 13 and mates closely with it, which is beneficial in terms of protecting the electrical components inside the base section 1, cover section 13 and inside the plate 5 and cap 14 from the external environment.

The embellisher 15 is then fitted to complete the installation of the equipment 8. The embellisher has clips 16 at the edge of its opening 17 for clipping it to the equipment 8.

Figure 4:
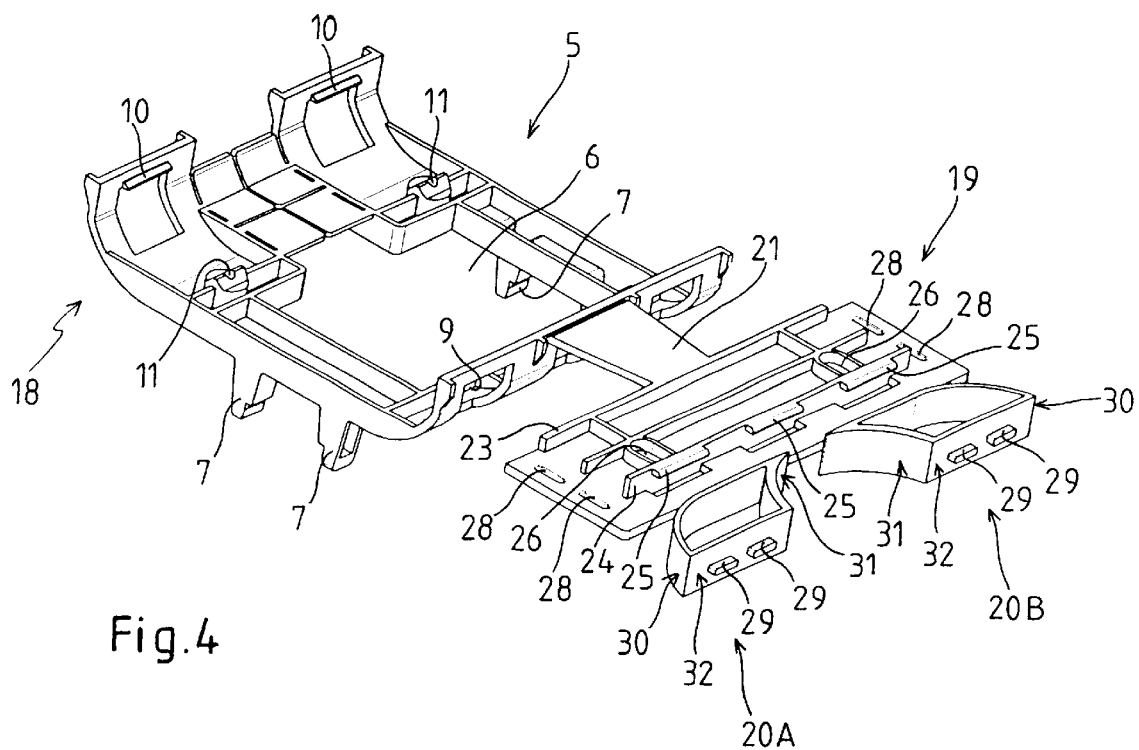
FIG. 4 is a perspective view of an assembly molded in one piece and comprising the support plate, a baseplate and two closure flanges enabling the equipment support to be fitted to trunking which is narrower than that shown in FIGS. 1 to 3.

The assembly 18 shown in FIG. 4 includes the plate 5 in particular and is molded in one piece from a plastics material.

In addition to the plate 5, it includes a baseplate 19 and two flanges 20A and 20B. There is a connecting tongue 21 between the plate 5 and the baseplate 19. The tongue 21 is joined to the plate 5 at the location of the central opening in its longitudinal edge which is seen at the top in FIGS. 1 and 2 by an area that is adapted to be cut. The tongue 21 is similarly joined to the center of one of the longitudinal edges of the baseplate 19 by an area that is adapted to be cut. Each flange 20A and 20B is joined to the baseplate 19 at the longitudinal edge opposite that joined to the tongue 21 by a tenon 22 (see FIG. 6). There is an area adapted to be cut between each tenon 22 and the baseplate 19, for detaching the flanges 20A and 20B therefrom.

Figure 5:
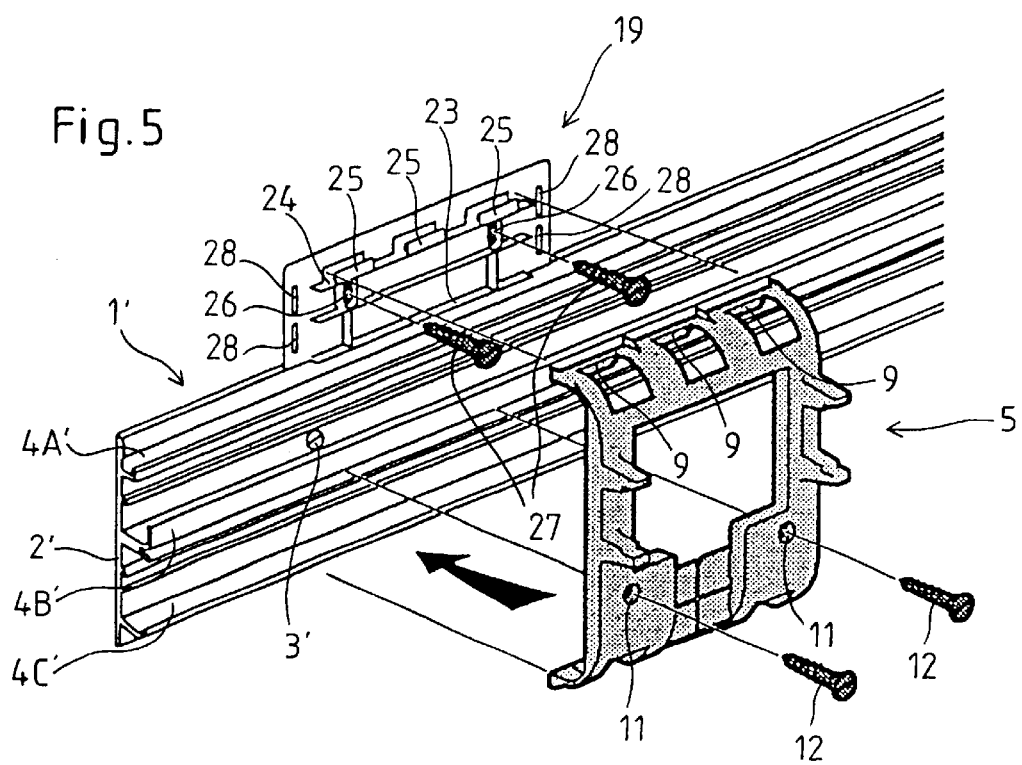
FIG. 5 is a view similar to FIG. 1, relating to the narrower trunking, and also showing how the baseplate is fitted to the same wall as that to which the base section of the trunking is fixed, before installing the plate.
Figure 6:
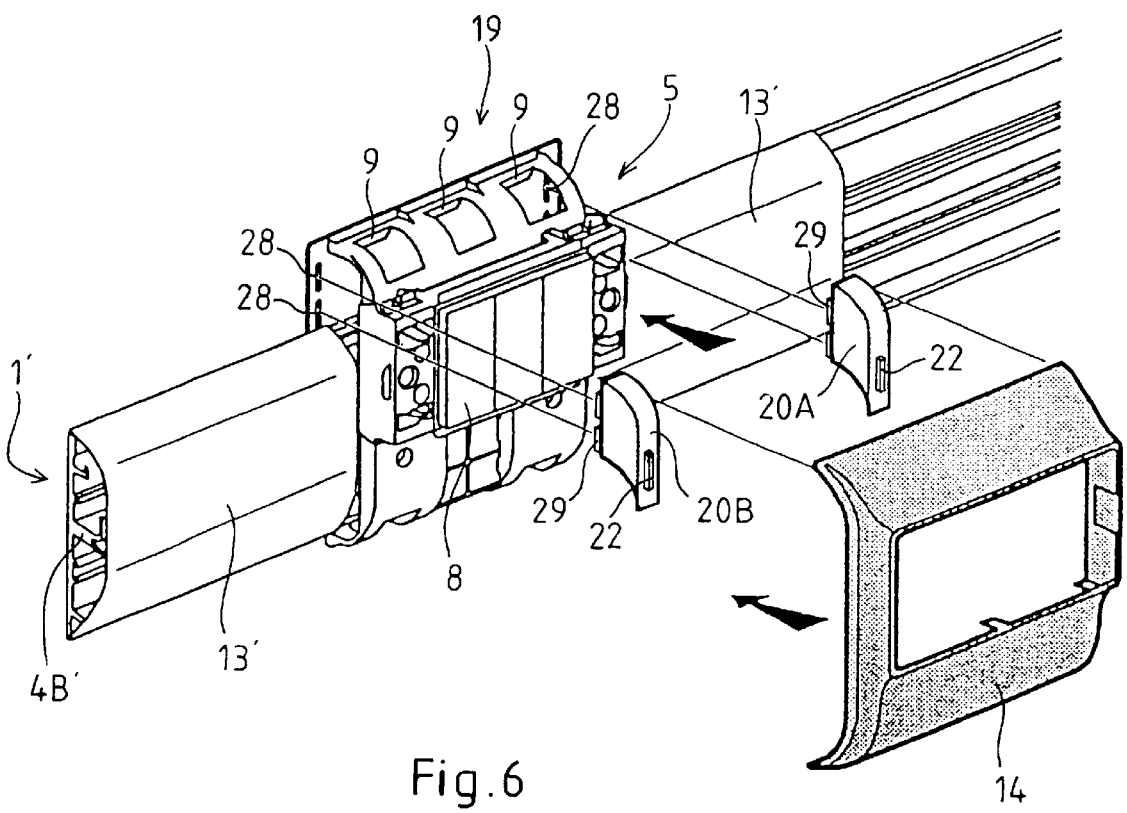
FIG. 6 is a view similar to FIG. 2, also showing how the closure flanges are fitted.
Figure 7:
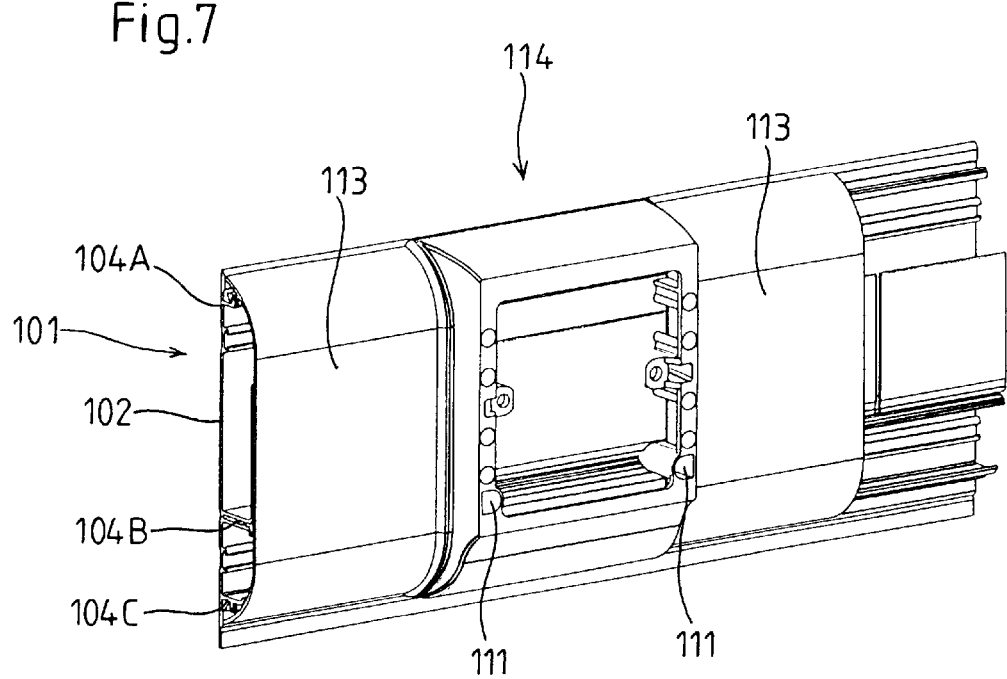
FIG. 7 is a view similar to FIG. 3 but omitting the embellisher and relating to a second embodiment of the support according to the invention, incorporating only a cap that fits directly over the trunking.
Figure 8:
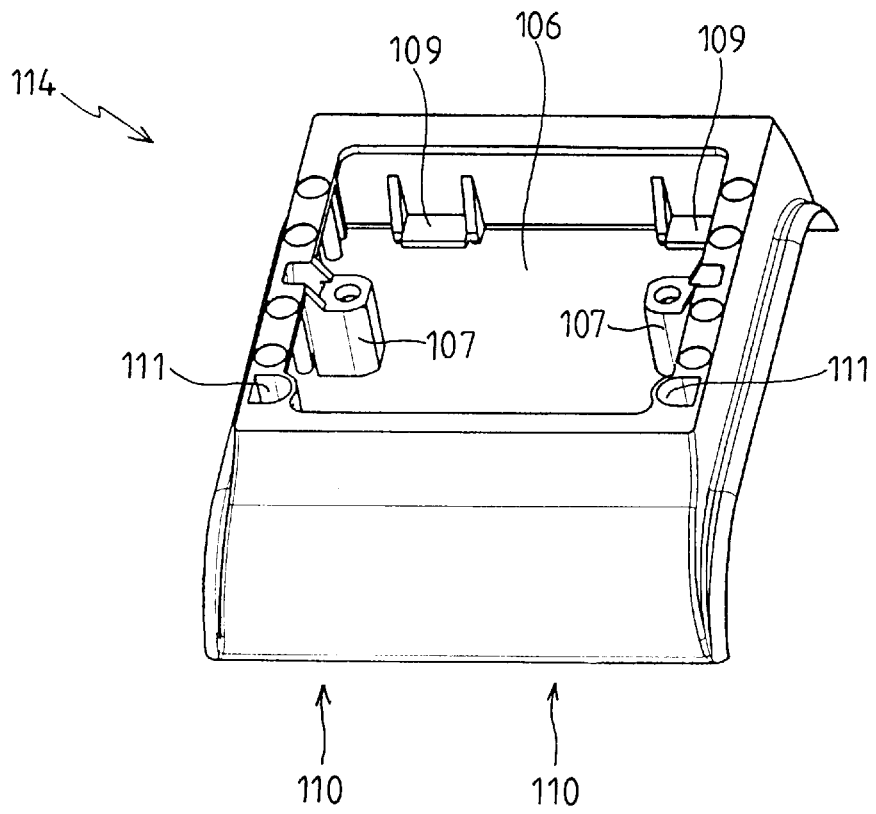
FIG. 8 is a perspective view of the cap.

As shown in FIGS. 5 and 6, the baseplate 19 and the flanges 20A and 20B enable the plate 5 an cap 14 to be fitted to base section 1' and cover section 13' which is narrower than the base section 1 and cover section 13, in this instance 80 mm wide rather than 120 mm. Components of the smaller trunking similar to those of the first mentioned trunking are generally identified by the same reference numbers "primed".

The baseplate 19 is of generally rectangular shape. Its width corresponds to that of the cap 14 (and is therefore greater than that of the plate 5). Its width is equal to the difference between that of the base section 1 and that of the base section 1'.

The baseplate 19 has a lateral rib 23 designed to facilitate locating the baseplate 19 on the longitudinal edge of the base section 1' along the longitudinal edge at which it was formerly joined to the tongue 21. The baseplate 19 has other longitudinal ribs on the same face and connected by transverse ribs with the result that the baseplate 19 has a ladder-like arrangement of ribs.

The longitudinal rib 24 at the greatest distance from the rib 23 has three retaining lugs 25 projecting from its longitudinal edge in a direction parallel to the general orientation of the baseplate 19 (and therefore transverse to the rib 24). It extends towards the opposite side of the rib 23 and the shape of the rib 24 and the lugs 25 and their locations on the baseplate 19 are such that when the side of its longitudinal edge on the same side as the rib 23 is in contact with the longitudinal edge of the base section 1' on the same side as the angle iron 4A' the rib 24 and the lugs 25 are able to cooperate with the plate 5 in exactly the same way as with the angle iron 4A of the base section 1, with each of the lugs 25 in corresponding relationship to a respective clip 9.

Two holes 26 are provided for screws 27 for fixing the baseplate 19 to the same wall as the base section 1'. Here the holes 26 are oblong holes and are surrounded by a portion of the ribbing of the baseplate 19.

The baseplate finally includes along each of its two transverse edges two elongate holes 28 providing mortises which receive tenons 29 on the flanges 20A and 20B.

When the baseplate 19 has been placed against the base section 1' and fixed to the wall by the screws 27, as shown in FIG. 5, the plate 5 is fitted to the assembly consisting of the base section 1' and the baseplate 19 in the same way as to the base section 1. As explained above, insofar as retaining the plate 5 is concerned, the rib 4A is replaced by the rib 24 and the lugs 25. The apron of the baseplate 19, i.e. its flat part from which the ribbing projects, extends the apron 2' of the base section 1' so that there is total electrical insulation at the level of the support 5, 14 from the wall to which the base section 1' and the baseplate 19 are fixed.

The flanges 20A and 20B are fitted when the plate 5 has been fitted to the base section 1' and the baseplate 19 in this way, the screws 12 have been inserted in the holes 11 and screwed into the flange 4B', the equipment 8 has been fitted into the plate 5 and the cover section 13' has been fitted to the base section 1', as shown in FIG. 6. They are designed to conceal the gaps that would otherwise remain between the cap 14, the baseplate 19 and the cover section 13', on the right-hand side and on the left-hand side.

Note that the edge of each of the closure flanges has a relatively long curved surface 30 with the same profile as the outside surface of the cover section 13 or the edge of the longitudinal edge portions of the cap 14, over some of its length from one end, that the edge of the flanges 20A and 20B has another curved surface 31 which has the same profile as the outside surface of the cover section 13' over part of its length from the end, and finally that the edge of the flanges 20A and 20B has a flat surface 32 between the surfaces 30 and 31 whose length corresponds to the width of the baseplate 19 and from which the tenons 29 project. Each of the flanges 20A and 20B has a plane wall flanked by a rim transverse to the plane wall and on the inside when the flanges have been fitted, as shown in FIG. 4 (this detail is not shown in FIG. 6).

The flanges 20A and 20B are fitted by engaging the tenons 29 in the mortises 28 with the surfaces 32 against the apron of the baseplate 19 and the surfaces 31 against the cover section 13'.

The cap 14 is then clipped to the plate 5, after which the flanges 20A and 20B respectively lie between the baseplate 19, the cover section 13' and the cap 14.

A longitudinal force towards the interior of the support 5, 14 applied to the flange 20A or 20B is absorbed by the corresponding edge of the plate 5 and, more generally, unseating of the flanges is very effectively prevented by the tenons 29 engaged in the mortises 28 and by the tenons 22 engaged with the cap 14.

In the embodiment shown in FIGS. 7 to 10 the assembly comprising the plate 5 and the cap 14 is replaced by a single cap 114 directly incorporating clips 109 and clips 110 having the same function as the clips 9 and 10, respectively, of the plate 5. The equipment is not fixed by clips 7, as to the plate 5, but is instead screwed to columns 107.

Components similar to those of the embodiment shown in FIGS. 1 to 6 are generally identified by the same reference number increased by 100.

In connection with the baseplate 119, note that the retaining means 125 for the clips 109 have lateral portions adapted to immobilize the clips 109, and therefore the cap 114, in the longitudinal direction.

Figure 9:
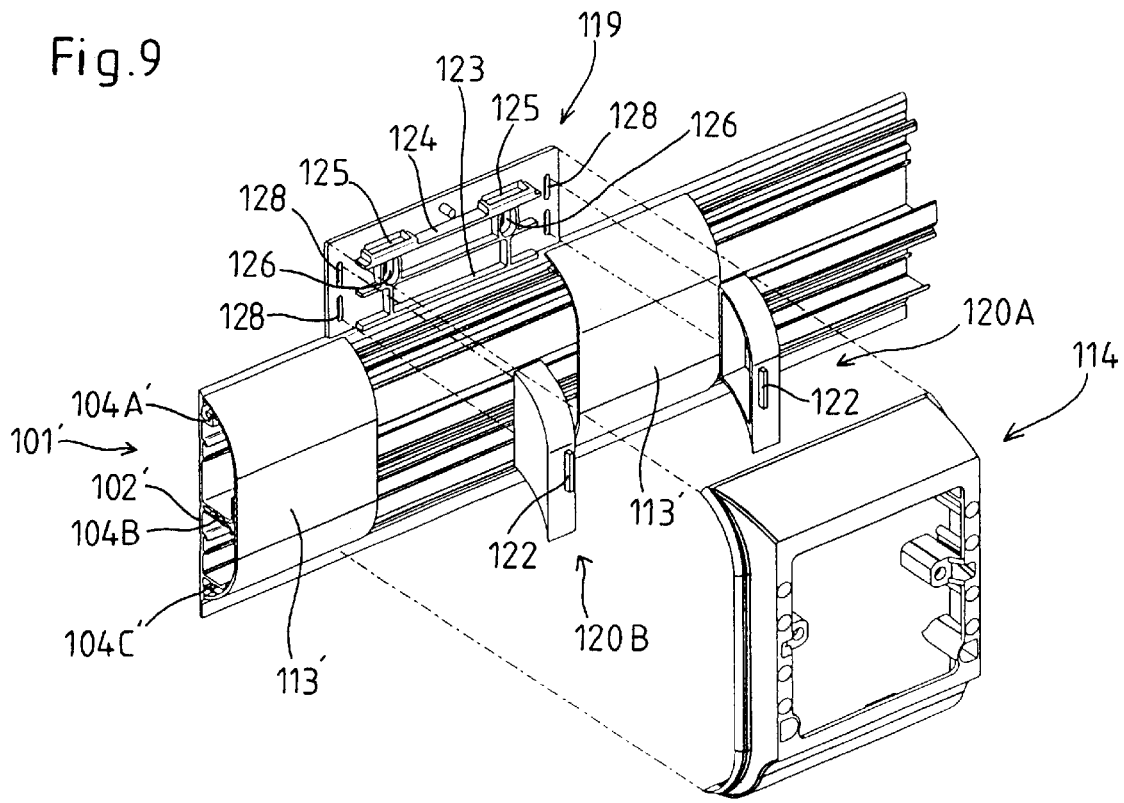
FIG. 9 is a view similar to FIGS. 5 and 6 showing how the baseplate, the cover section of the trunking and the closure flanges are fitted to narrower trunking before installing the equipment support.
Figure 10:
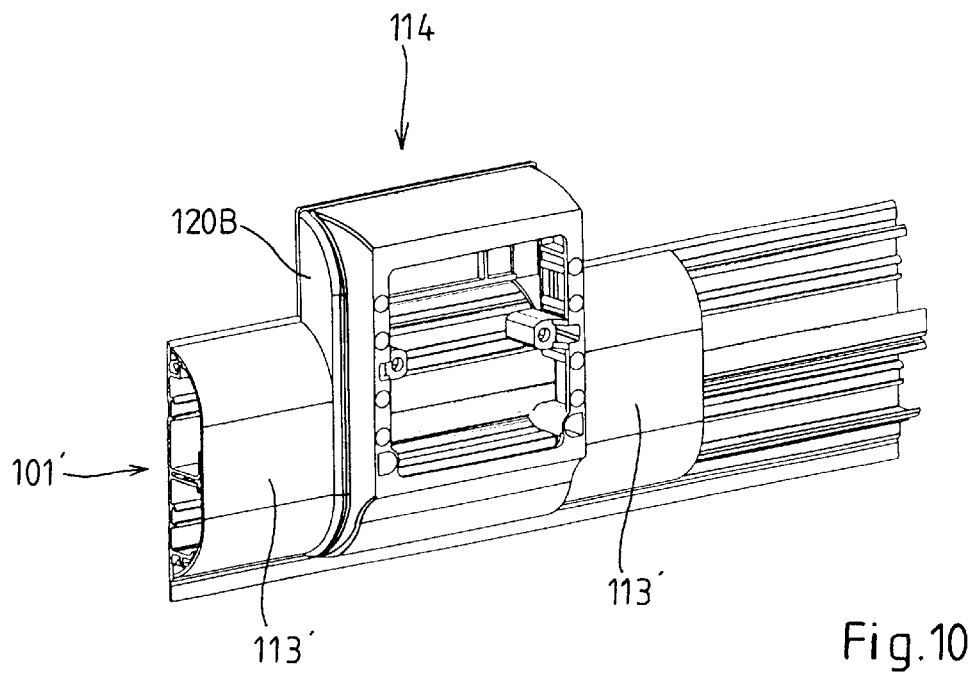
FIG. 10 shows the components when installed.

Of course, the cover 113' and the flanges 120A and 120B are fitted before clipping the cap 114 to the base section 101' and to the baseplate 119, as shown in FIG. 9. The distance between the two lengths of cover section at the level of the cap 114 is less than the width of the cap and of the baseplate 119 to enable contact of the flanges 120A and 120B and of the edge of the cap 114 with the cover section.

In an embodiment that is not shown the baseplate 19 is replaced with a baseplate having an area adapted to be cut in order to eliminate a portion of it so that it can be used to fit the equipment support to trunking whose width is between that of the nominal width trunking 1, 13 and 101, 113 and that of the narrower trunking 1', 13' and 101', 113'. A second pair of closure flanges suitable for this intermediate width is also provided.

Many other embodiments are possible, depending on individual circumstances, and the invention is not limited to the examples described and shown.

There is claimed:

1. An electrical equipment support for attaching to a trunking of nominal width, said support including adapter means enabling it to be fitted to a trunking of lower width, said adapter means including two closure flanges adapted to be fitted between said trunking of lower width and said support along a respective portion of transverse edges of said support, wherein said adapter means further include a baseplate adapted to be fitted to flank a base section of said trunking of lower width from one of said closure flanges to the other and having engagement means adapted to fasten said flanges together.

2. The support claimed in claim 1 further including a clip-on member having along a first longitudinal edge a first series of clips comprising at least one clip and along a second longitudinal edge a second series of clips comprising at least one clip, wherein each clip of said first and second series is adapted to interengage with a respective first retaining member and a respective second retaining member of a base section of said trunking of nominal width and said baseplate has retaining means adapted to receive said first series of clips to enable said clip-on member of the support to be clipped by said first series of clips to said retaining means of said baseplate, when it flanks said base section of said trunking of lower width, and by said second series of clips to a retaining member of said trunking of lower width.

3. The support claimed in claim 2 wherein said retaining means of said baseplate are adapted to immobilize said support in the longitudinal direction.

4. The support claimed in claim 1 wherein said baseplate has openings for screws for fixing it to a wall.

5. The support claimed in claim 1 wherein said baseplate has a lateral locating rib along a longitudinal edge of said base section of said trunking of lower width.

6. The support claimed in claim 1 wherein said baseplate has an area adapted to be cut to eliminate a portion thereof so that it can be used to fit said equipment support to trunking whose width is between that of said trunking of nominal width and that of said trunking of lower width.

7. The support claimed in claim 1 wherein said engagement means of said baseplate for attaching said closure flanges consist of at least one mortise for each flange formed in a thickness of said baseplate.

8. The support claimed in claim 1 wherein each of said closure flanges is adapted to be flanked by said baseplate, a cover section of said trunking of lower width and a cap of said support, respectively, when said support is fitted to said trunking of lower width.

9. The support claimed in claim 1 wherein said closure flanges each have an edge delimited by a first curved surface, a second curved surface connected to said first curved surface and a flat surface between said first curved surface and said second curved surface, said first curved surface follows a profile of an outside surface of a cover section of said trunking of nominal width, said second curved surface follows a profile of an outside surface of a cover section of said trunking of lower width and said flat surface follows a profile of an outside surface of said baseplate.

10. The support claimed in claim 1 wherein said closure flanges each include tenons adapted to be engaged in mortises in said baseplate.

11. The support claimed in claim 1 wherein said closure flanges each include a tenon adapted to interengage with a cap of said support.

12. The support claimed in claim 1 wherein said closure flanges each have a plane wall framed on the inside by a rim transverse to said plane wall.

13. The support claimed in claim 1 further including a plate adapted to be clipped either to a base section of said trunking of nominal width or to said baseplate and to a base section of said trunking of lower width and a cap adapted to be clipped to said plate.

14. The support claimed in claim 13 wherein said cap is wider than said plate and, when said support is fitted, its transverse edges come into contact either with a cover section of said trunking of nominal width or with a cover section of said trunking of lower width and with said closure flanges and said cover sections of said trunkings of nominal and lower width are disposed against said plate, on respective opposite sides thereof.

15. The support claimed in claim 1 further including a cap adapted to be clipped either to a base section of said trunking of nominal width or to said baseplate and to a base section of said trunking of lower width, and said cap having transverse edges contacting either with a cover section of said trunking of nominal width or with a cover section of said trunking of lower width and with said closure flanges and, each of said cover sections of said trunkings of nominal and lower width is interrupted at the level of said cap over a length less than that of said cap.

16. The support claimed in claim 1 wherein said baseplate and said closure flanges are molded in one piece with a portion of said support and adapted to be separated from it by areas adapted to be cut.

* * * * *